US009003679B2

(12) United States Patent
Baucom et al.

(10) Patent No.: US 9,003,679 B2
(45) Date of Patent: Apr. 14, 2015

(54) CUSTOMIZATION OF INNER SOLE BOARD

(75) Inventors: Jim Baucom, Portland, OR (US); Clifford B. Gerber, West Linn, OR (US)

(73) Assignee: NIKE, Inc., Beaverton, OR (US)

( * ) Notice: Subject to any disclaimer, the term of this patent is extended or adjusted under 35 U.S.C. 154(b) by 1150 days.

(21) Appl. No.: 12/186,600

(22) Filed: Aug. 6, 2008

(65) Prior Publication Data
US 2010/0031531 A1 Feb. 11, 2010

(51) Int. Cl.
| A43B 13/28 | (2006.01) |
| A43B 5/00 | (2006.01) |
| A43B 13/18 | (2006.01) |
| A43B 13/20 | (2006.01) |
| A43B 13/38 | (2006.01) |
| B29D 35/06 | (2010.01) |
| A43B 17/00 | (2006.01) |
| A43B 17/14 | (2006.01) |
| B29D 35/14 | (2010.01) |

(52) U.S. Cl.
CPC ............ B29D 35/061 (2013.01); *A43B 13/188* (2013.01); *A43B 17/003* (2013.01); *A43B 17/14* (2013.01); *B29D 35/142* (2013.01); *B29D 35/148* (2013.01)

(58) Field of Classification Search
CPC ......... A43B 7/141; A43B 7/142; A43B 17/02
USPC ................. 36/43, 44, 71, 140, 154; 12/146 B
See application file for complete search history.

(56) References Cited

U.S. PATENT DOCUMENTS

| 1,592,445 | A | * | 7/1926 | Cutler ........................ 12/142 R |
| 1,914,049 | A | | 6/1933 | Smith |
| 3,042,948 | A | * | 7/1962 | Di Nunzio ................ 12/146 B |
| 3,233,348 | A | * | 2/1966 | Gilkerson ........................ 36/44 |
| 3,341,952 | A | | 9/1967 | Dassler |
| 3,410,005 | A | | 11/1968 | Szerenyi |
| 3,444,586 | A | | 5/1969 | Dubner |
| 3,738,373 | A | * | 6/1973 | Glancy ............................ 36/144 |
| 4,231,169 | A | * | 11/1980 | Toyama et al. .................... 36/43 |
| 4,408,402 | A | * | 10/1983 | Looney ............................ 36/43 |
| 4,410,575 | A | * | 10/1983 | Obayashi et al. ............... 428/57 |

(Continued)

FOREIGN PATENT DOCUMENTS

| EP | 0443121 | 8/1991 |
| GB | 2088776 | 6/1982 |

(Continued)

*Primary Examiner* — Khoa Huynh
*Assistant Examiner* — Timothy K Trieu
(74) *Attorney, Agent, or Firm* — Plumsea Law Group, LLC

(57) ABSTRACT

An inner sole board having varying regions of flexibility is provided for use in an article of footwear. The inner sole board may include different materials along its length at different locations that vary its flexibility. An inner sole board is manufactured in an injection molding process requiring only one mold. The process includes a first step of providing a mold, a second step of providing an injection molding assembly, a third step of preparing an injection molding assembly and mold, a fourth step of injecting material into the mold, and a fifth step of establishing the dimensions of a first portion. During the injection molding process, the flow rate of at least one material may be controlled by a nozzle gate to control the shape and size of the flex zone it creates. In this manner, the inner sole board may be customized for a specific sport or individual.

13 Claims, 13 Drawing Sheets

(56) References Cited

U.S. PATENT DOCUMENTS

| | | | |
|---|---|---|---|
| 4,510,700 A * | 4/1985 | Brown | 36/44 |
| 4,602,442 A * | 7/1986 | Revill et al. | 36/44 |
| 4,627,177 A * | 12/1986 | Meyers | 36/43 |
| 4,744,157 A | 5/1988 | Dubner | |
| 4,769,926 A * | 9/1988 | Meyers | 36/43 |
| 4,787,156 A | 11/1988 | Bade | |
| 4,794,707 A * | 1/1989 | Franklin et al. | 36/107 |
| 4,910,886 A | 3/1990 | Sullivan et al. | |
| 4,955,740 A * | 9/1990 | Renz et al. | 403/27 |
| 5,005,299 A | 4/1991 | Whatley | |
| 5,014,706 A * | 5/1991 | Philipp | 36/140 |
| 5,052,130 A | 10/1991 | Barry et al. | |
| 5,077,916 A | 1/1992 | Beneteau | |
| 5,185,943 A | 2/1993 | Tong et al. | |
| 5,212,894 A * | 5/1993 | Paparo | 36/43 |
| 5,369,896 A * | 12/1994 | Frachey et al. | 36/29 |
| 5,452,526 A | 9/1995 | Collins | |
| 5,467,536 A * | 11/1995 | Ramer et al. | 36/28 |
| 5,473,827 A | 12/1995 | Barre et al. | |
| 5,625,965 A * | 5/1997 | Blissett et al. | 36/43 |
| 5,628,128 A | 5/1997 | Miller et al. | |
| 5,659,979 A * | 8/1997 | Sileo | 36/54 |
| 5,692,318 A * | 12/1997 | Aliano, Jr. | 36/25 R |
| 5,755,001 A * | 5/1998 | Potter et al. | 12/142 P |
| 5,778,561 A * | 7/1998 | Shimoyama | 36/43 |
| 5,822,886 A | 10/1998 | Luthi et al. | |
| 5,881,478 A * | 3/1999 | McMahon et al. | 36/144 |
| 5,951,935 A | 9/1999 | Healy et al. | |
| 6,038,790 A * | 3/2000 | Pyle et al. | 36/30 R |
| 6,041,521 A * | 3/2000 | Wong | 36/28 |
| 6,131,311 A * | 10/2000 | Brown et al. | 36/43 |
| 6,199,303 B1 | 3/2001 | Luthi et al. | |
| 6,477,791 B2 | 11/2002 | Luthi et al. | |
| 6,481,120 B1 * | 11/2002 | Xia et al. | 36/44 |
| 6,502,330 B1 | 1/2003 | David et al. | |
| 6,562,167 B2 * | 5/2003 | Coenen et al. | 156/73.1 |
| 6,598,319 B2 * | 7/2003 | Hardt | 36/28 |
| 6,857,205 B1 | 2/2005 | Fusco et al. | |
| 6,915,598 B2 | 7/2005 | Grisoni et al. | |
| 7,013,581 B2 * | 3/2006 | Greene et al. | 36/25 R |
| 7,047,670 B2 * | 5/2006 | Marvin et al. | 36/29 |
| 7,168,187 B2 * | 1/2007 | Robbins | 36/30 R |
| 7,178,269 B2 * | 2/2007 | Bauerfeind et al. | 36/30 A |
| 7,347,012 B2 * | 3/2008 | Clark et al. | 36/50.1 |
| 7,410,684 B2 * | 8/2008 | McCormick | 428/190 |
| 7,426,794 B2 * | 9/2008 | Swensen | 36/43 |
| 7,513,067 B2 * | 4/2009 | Marvin et al. | 36/50.1 |
| 7,712,231 B2 * | 5/2010 | Umezawa et al. | 36/142 |
| 7,832,118 B2 * | 11/2010 | Holden et al. | 36/35 R |
| 7,954,257 B2 * | 6/2011 | Banik | 36/28 |
| 7,958,653 B2 * | 6/2011 | Howlett et al. | 36/44 |
| 8,333,023 B2 * | 12/2012 | Losio | 36/44 |
| 8,641,845 B2 * | 2/2014 | Bruck | 156/64 |
| 2002/0092203 A1 * | 7/2002 | Hardt | 36/43 |
| 2003/0005599 A1 | 1/2003 | Panaccione | |
| 2003/0089000 A1 * | 5/2003 | Tseng | 36/45 |
| 2004/0025376 A1 * | 2/2004 | Grisoni et al. | 36/44 |
| 2004/0255486 A1 * | 12/2004 | Pawlus et al. | 36/10 |
| 2005/0268491 A1 * | 12/2005 | McDonald et al. | 36/28 |
| 2006/0006079 A1 | 1/2006 | Brooks | 206/278 |
| 2006/0026866 A1 * | 2/2006 | Avent et al. | 36/44 |
| 2006/0123664 A1 | 6/2006 | Boyd et al. | |
| 2006/0185197 A1 * | 8/2006 | Rhenter | 36/174 |
| 2006/0242860 A1 | 11/2006 | Canvin | |
| 2007/0033835 A1 * | 2/2007 | Bray | 36/44 |
| 2007/0084084 A1 | 4/2007 | Rich | |
| 2007/0107258 A1 * | 5/2007 | Umezawa et al. | 36/30 R |
| 2008/0271340 A1 * | 11/2008 | Grisoni et al. | 36/43 |
| 2010/0043252 A1 * | 2/2010 | Losio | 36/44 |
| 2011/0041780 A1 * | 2/2011 | Hurwitz | 119/850 |
| 2012/0167413 A1 * | 7/2012 | Marvin et al. | 36/83 |

FOREIGN PATENT DOCUMENTS

| | | |
|---|---|---|
| GB | 2136671 | 9/1984 |
| WO | WO 2005058085 | 6/2005 |
| WO | WO2005089580 A1 * | 9/2005 |

* cited by examiner

CUSTOMIZATION OF INNER SOLE BOARD

BACKGROUND OF THE INVENTION

1. Field of the Invention

The present invention relates generally to an inner sole board, and more specifically to a customizable inner sole board.

2. Description of Related Art

Generally, soles and sole portions may be designed to provide support and protection, prevent injury, and correct or mitigate foot and other bodily ailments. Articles of footwear, for example, athletic shoes, may be designed to have soles or sole portions of varying flexibility to provide the support typically needed for a particular activity or sport. For example, soccer cleats are typically rigid in the posterior and more flexible in the forefoot region. However, football cleats tend to be more rigid in the forefoot region, in part to prevent turf toe injuries.

Different sole structures have been proposed. U.S. Pat. No. 3,444,586 to Dubner teaches a shoe made with a quick setting material that may be injected into the shoe to increase foot comfort. The Dubner shoe has an upper flexible portion, a sole, a heel, a sock lining, and a shank. The shank and sole have an opening through which molding material may be injected into the shoe. The sole interior includes four recesses and each recess accommodates a molding material receiving bag. The four receiving bags are in fluid communication with the opening and receive molding material upon injection. An injection means, including an injection gun, engages with the shoe at the opening to fill two receiving bags at a time. The material in two of the bags are filled and set while the wearer is sitting, and the material in the remaining two bags are filled and set while the wearer is walking.

U.S. Patent Application Number 2006/0242860 to Canvin teaches a thick insole with cavities able to receive inserts so that the hardness of the heel, arch, and metatarsal regions can be customized for a particular wearer. The insole has a main body with a bottom side having two cavities. A first cavity, the metatarsal cavity, mates with a metatarsal insert. A second cavity, the heel and arch cavity, mates with a heel and arch insert. The main body and inserts are separately made and comprise injection-molded foam. In order to provide variations in the hardness of the insole, the inserts may be formed of a different material than the main body. An article of footwear may be sold as a kit with multiple sets of interchangeable insoles. Each set of insoles is sized for the footwear and varies with respect to the durometer of the inserts or the durometer main body. The shape and size of portions of the insole may also be varied.

UK Patent Application GB2136671A to Buller teaches an injection molded insole having increased flexibility in the forepart. The insole has a forepart, a waist region, and a rear region. Generally, the insole is integrally formed through an injection molding process. The forepart is relatively thin and includes an aperture. As a result, the forepart is more flexible than the remainder of the insole. The portion of the forepart surrounding the aperture is the peripheral zone. In another embodiment, the aperture may be covered by a thin web of material. The insole, including the aperture or the web, is injection molded using one mold. In other embodiments, the aperture may be occupied by a filler comprising a foam plastic material. The filler is either formed and inserted into the aperture after the injection molding process or added into the mold before the injection molding process so that the filler bonds to the mold material during the molding process.

In general, footwear having soles with varying flexibility characteristics are known in the art. Soles using multiple materials are also generally known. However, the flexibility characteristics of these soles generally cannot be controlled when multiple materials are injected into a single mold. In particular, controlling the size and shape of at least one of the co-molded materials during the co-molding process is not known. Therefore, there is a need in the art for a system and method that addresses the shortcomings of the art.

SUMMARY OF THE INVENTION

An inner sole board and method of making an inner sole board are disclosed.

In one aspect, an inner sole board for an article of footwear comprises a first portion comprising a first material, a second portion comprising a second material, and a bonding zone disposed where the first portion and the second portion meet. The first material having different flexibility characteristics than the second material. The size and the location of the first portion with respect to the second portion is configured to conform to a set of flexibility characteristics associated with an activity. The bonding zone comprises a bond between the first material and the second material that is initiated when the first material and second material are in a molten state.

In another aspect, the first portion is disposed in a forefoot region of the article of footwear.

In another aspect, the first portion is disposed in a heel region of the article of footwear.

In another aspect, the first portion has a first thickness, the second portion has a second thickness, and the first thickness and the second thickness are substantially equal proximate the bonding zone.

In another aspect, the first portion has a circular shape.

In another aspect, the first portion is substantially coextensive with the forefoot region.

In another aspect, a kit for customizing an article of footwear comprises a group of inner sole boards wherein each inner sole board of the group of inner sole boards is configured to be removably inserted into the article of footwear.

In another aspect, each inner sole board has a unique flexibility characteristic.

In another aspect, each inner sole board comprises a first portion comprising a first material, a second portion comprising a second material, and a bonding zone disposed where the first portion and the second portion meet.

In another aspect, the first material having different flexibility characteristics than the second material.

In another aspect, the size and location of the first portion with respect to the second portion is configured to conform to a set of flexibility characteristics associated with an activity.

In another aspect, the bonding zone comprises a bond between the first material and the second material that is initiated when the first material and second material are in a molten state.

In another aspect, the group of inner sole boards comprise left-foot inner sole boards.

In another aspect, the group of inner sole boards comprise right-foot inner sole boards.

In another aspect, the kit comprises left-foot inner sole boards and right-foot inner sole boards.

In another aspect, the method of making an inner sole board comprising the steps of providing a mold having a single cavity; providing an injection molding assembly comprising a first nozzle and a second nozzle; injecting into the cavity a first molten material through the first nozzle and a second molten material through the second nozzle so that the first molten material forms a first portion of the inner sole board and the second molten material forms a second region of the inner sole board; and establishing dimensions of the first portion by controlling the first nozzle.

In another aspect, the dimensions of the first portion are established by controlling a first flow rate through the first nozzle.

In another aspect, the dimensions of the first portion are established by controlling a first nozzle time on and a first nozzle time off.

In another aspect, the dimensions of the first portion are established by controlling the second nozzle.

In another aspect, the dimensions of the first portion are established by controlling a second nozzle time on and a second nozzle time off.

In another aspect, the dimensions of the first portion are established by staggering the first nozzle time on and the second nozzle time on.

In another aspect, the dimensions of the first portion are established by staggering the first nozzle time off and the second nozzle time off.

In another aspect, the first material and second material form a bond in a bonding zone at a temperature greater than or equal to a bonding temperature.

In another aspect, the first material and the second material are delivered into the cavity simultaneously.

In another aspect, the bond is selected from a group consisting of a chemical bond and a mechanical bond.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

An inner sole board having varying regions of flexibility is provided for use in an article of footwear. A method of making the inner sole board is also provided. In some embodiments, the inner sole board may be customized to a desired flexibility for a particular sport or individual.

Generally, the flexibility of an object may be changed by altering different features or aspects of an object. These features may include the length, width, thickness, and shape of the object. Flexibility may also be changed by altering the material properties of the object. For example, in one embodiment, the object may be made of a first material. In another embodiment, the object may be made of a second, softer material. In yet another embodiment, the object may include one or more materials of varying rigidity at various locations within the object.

The inner sole board may include different materials along its length at different locations that vary its flexibility along its length. One region of the inner sole board may include a different material than the rest of the inner sole board, or the inner sole board may include multiple regions having different materials.

Figure 1:
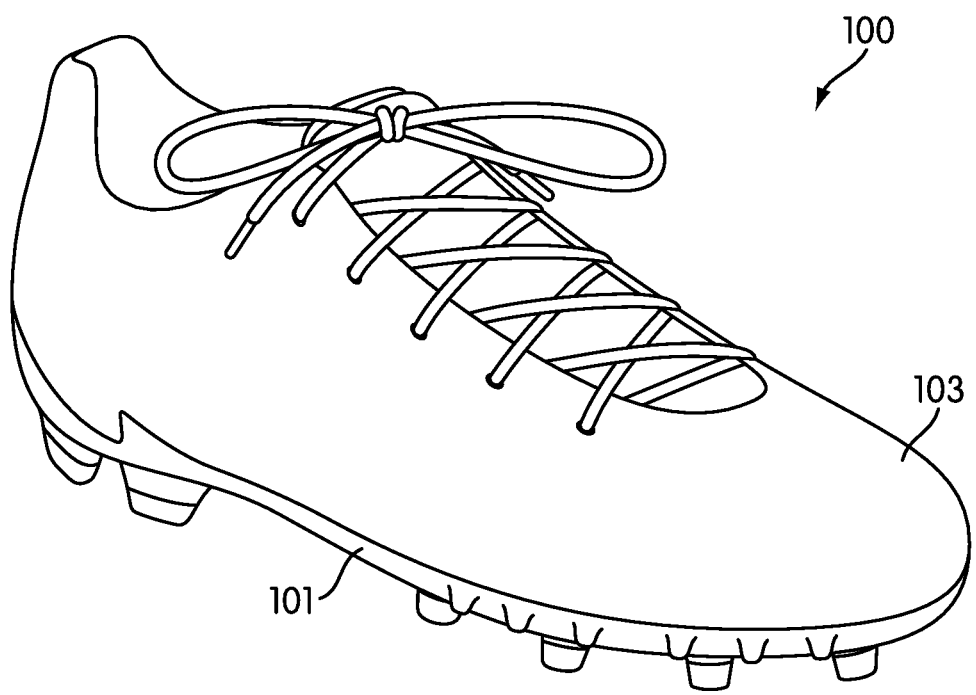
FIG. 1 is a schematic isometric view of one embodiment of a cleated article of footwear.

The inner sole board may be positioned in a sole of an article of footwear 100. FIG. 1 is a schematic isometric view of one embodiment of a cleated article of footwear. Cleated article of footwear 100 may include a cleated sole 101 attached to an upper 103.

Upper 103 may be any type of upper known in the art. Upper 103 is depicted as having a substantially conventional configuration incorporating a plurality of material elements (e.g., textiles, foam, leather, and synthetic leather) that are stitched or adhesively bonded together to form an interior void for securely and comfortably receiving a foot. Given that various aspects of the present application primarily relate to sole 101, upper 103 may exhibit the general configuration discussed above or the general configuration of practically any other conventional or non-conventional upper. Accordingly, the structure of upper 103 utilized with sole 101 or variants thereof may vary significantly.

In some embodiments, the inner sole board may comprise a part of cleated sole 101. However, in other embodiments, the inner sole board may be incorporated into the soles of different types of articles of footwear. For example, the inner sole board may be incorporated into a hiking shoe or a dress shoe.

Figure 2:
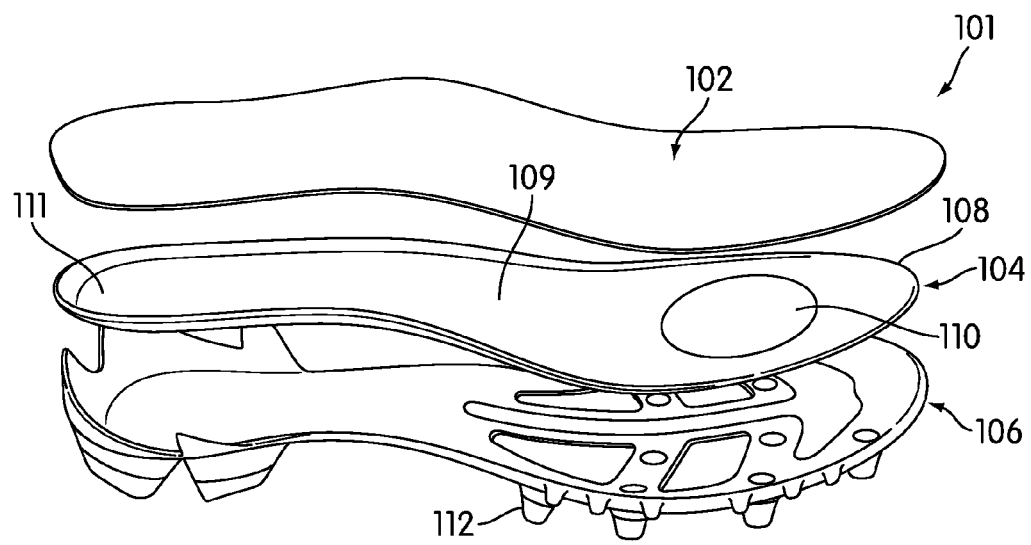
FIG. 2 is a schematic isometric exploded view of one embodiment of a cleated sole.

FIG. 2 is a schematic isometric exploded view of an embodiment of a cleated sole 101 incorporating an inner sole board 104. Cleated sole 101 may be a layered sole including a sock liner 102, an inner sole board 104, and a cleat plate 106. Sock liner 102 may be a first layer configured to be in contact with a wearer's foot and a second layer, inner sole board 104. Sock liner 102 may be made of a soft material to provide additional comfort to a wearer's foot and/or wick moisture away from the wearer's foot. In some embodiments, sock liner 102 may be removably attached to cleated sole 101. However, in other embodiments, sock liner 102 may not be removable.

Cleat plate 106 may be a third layer configured to be in contact with inner sole board 104 and the ground. Cleat plate 106 may include one or more cleats 112 for gripping the ground.

Inner sole board 104 may provide additional support for a wearer's foot. Inner sole board 104 may generally be a layer of material formed to align with the contours of the wearer's foot. Inner sole board 104 may be stiffer or more rigid than sock liner 102. In some embodiments, inner sole board 104 may be removable from cleated sole 101. However, in other embodiments, inner sole board 104 may not be removable.

Inner sole board 104 may be described as having a forefoot region 108, a mid-foot region 109, and a heel region 111. The desired stiffness of each region may vary for a particular activity or individual. For example, in some embodiments, it may be desirable to change the flexibility of inner sole board 104 in forefoot region 108. In the exemplary embodiment shown in FIG. 2, forefoot region 108 may have a forefoot flex zone 110 that causes forefoot region 108 to be more flexible than the remainder of inner sole board 104.

Figure 3:
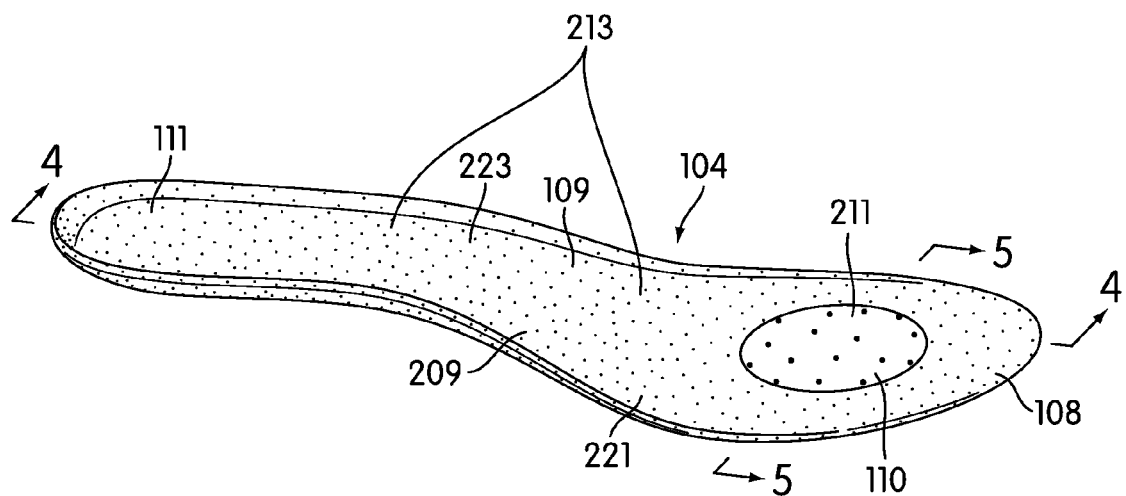
FIG. 3 is a schematic isometric view of one embodiment of an inner sole board.
Figure 4:
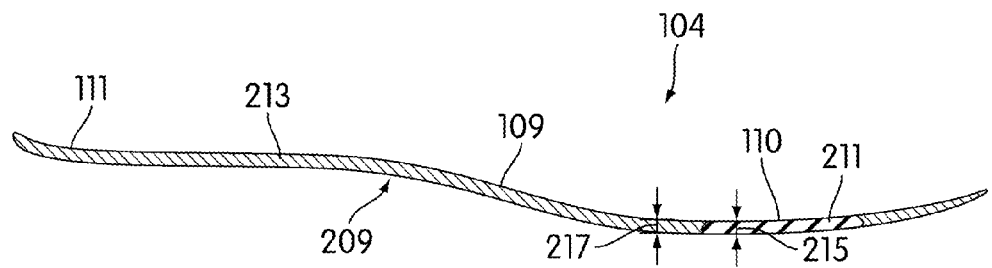
FIG. 4 is a schematic cross-sectional diagram of the inner sole board shown in FIG. 3, taken along line 4-4.
Figure 5:
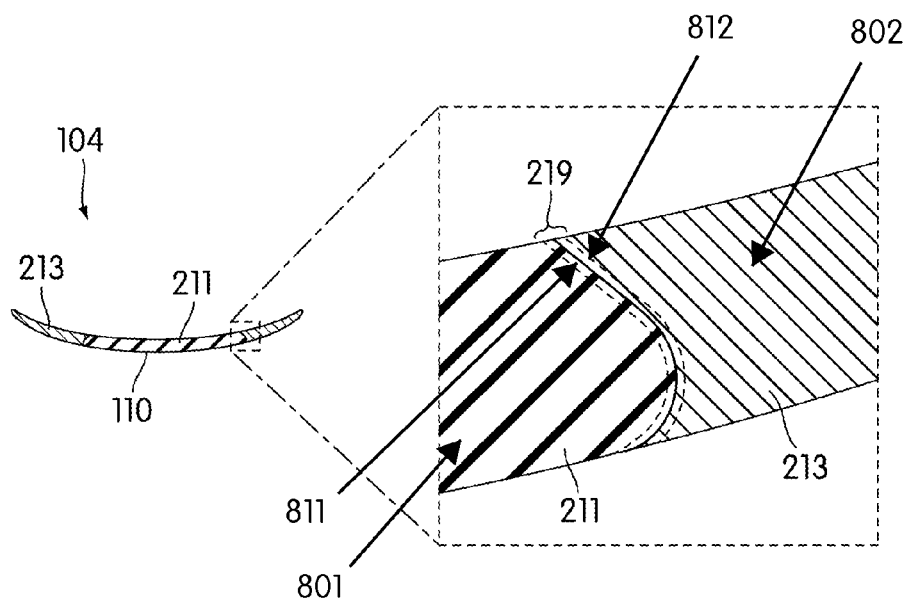
FIG. 5 is a schematic enlarged cross sectional diagram of the inner sole board shown in FIG. 3, taken along line 5-5.

FIG. 3 is a schematic isometric view of one embodiment of inner sole board 104. FIG. 4 is a schematic longitudinal cross-sectional diagram of inner sole board 104, taken along line 4-4. FIG. 5 is a schematic enlarged transverse cross sectional diagram of inner sole board 104, taken along line 5-5. Inner sole board 104 may generally include two regions: a forefoot flex zone 110 or first portion and an inner sole body 209 or second portion. Forefoot flex zone 110 may be positioned in forefoot region 208. Inner sole body 209 may provide the remainder of inner sole board 104. Inner sole body 209 and forefoot flex zone 110 may be made from different materials. Forefoot flex zone 110 may primarily include a first material 211, and inner sole body 209 may primarily include a second material 213.

In some embodiments, first material 211 may be positioned on inner sole board 104 so that second material 213 surrounds at least a periphery of first material 211 at forefoot region 108. In some embodiments, first material 211 may have a different stiffness than second material 213. For example, first material 211 may be less stiff, i.e., more flexible, than second material 213. The resulting configuration provides increased flexibility in forefoot region 108. When installed in an article of footwear, for example article of footwear 100, and used by the wearer, the increased flexibility in forefoot region 108 results in a trampoline effect or a multidirectional spring loaded response in forefoot region 108. Therefore, when the wearer's weight pushes on forefoot region 108, forefoot region 108 may bend or bow slightly, particularly at or near forefoot flex zone 110. However, the stiffness of forefoot region 108 due to second material 213, which is stiffer than first material 211, may inhibit over flexing. Therefore, injury to the wearer's foot may be avoided. When the wearer pushes off from the ground, the energy stored in the bending of forefoot region 108 may be released in a spring-like action to assist the wearer. This may help prevent the wearer's foot from becoming tired.

Inner sole board 104 may be customized by varying the size and shape of forefoot flex zone 110. A larger flex zone 110, i.e., a flex zone 110 that occupies a relatively large percentage of forefoot region 108, may provide greater flexibility in forefoot region 108. For example, a larger forefoot flex zone 110 may be used in a soccer cleat where a relatively flexible forefoot region 108, relatively rigid mid-foot region 109, and relatively rigid heel region 111 are desirable.

The flexibility of inner sole board 104 in forefoot region 108 may also be varied by changing the characteristics of material 211. In different embodiments, the flexibility characteristics, chemical composition, shape, thickness, and location of first material 211 with respect to second material 213 may vary. The flexibility of first material 211 may be such that it increases the flexibility of inner sole board 104 in forefoot region 108. Therefore, first material 211 may be less stiff than second material 213. However, in other embodiments, it may be desirable for first material 211 to be stiffer than second material 213 so that first material 211 increases the rigidity of inner sole board 104 in forefoot region 108.

First material 211 may be any material that can mechanically and/or chemically bond with second material 213. First material 211 and second material 213 may be selected to be compatible for bonding purposes. Preferably, first material 211 is chemically similar to second material 213 in that first material 211 and second material 213 may have one or more of the same basic components. For example, in some embodiments, first material 211 may be a copolymer polypropylene, and second material 213 may be a polypropylene with glass. However, in other embodiments, first and second materials 211, 213 having different chemical compositions may be utilized.

FIG. 5 shows a schematic representation of bonding zone 219. The magnified area in FIG. 5 shows bonding zone 219 as a region where a first portion 801 of inner sole board 104 being formed of first material 211 and a second portion 802 of inner sole board 104 formed of second material 213 meet and mechanically and/or chemically bond. Bonding zone 219 is shown exaggerated in size for description purposes. Bonding zone 219 may begin to develop when materials 211, 213 are in a molten state. Bonding zone 219 then solidifies when materials 211, 213 are cured. Although, bonding zone 219 is shown as a smooth curve, bonding zone 219 may include irregular or jagged boundaries. In some embodiments, compatible materials may be selected to improve the chemical bonding between first material 211 and second material 213. The formation of a mechanical and/or chemical bond between compatible materials, first material 211 and second material 213, may increase the durability of inner sole board 104 by reducing the likelihood that first material 211 splits or separates from second material 213 over time. Bonding zone 219 may have a bond width including a first portion 811 and a second portion 812. As shown in FIG. 5, first portion 811 of the bond width may extend into first portion 801 of inner sole board 104. That is, first portion 801 of inner sole board 104 may include first portion 811 of the bond width. Similarly, second portion 812 of the bond width may extend into second portion 802 of inner sole board 104. That is, second portion 802 of inner sole board 104 may include second portion 812 of the bond width.

The shape of first material 211 may be any shape that increases the flexibility of inner sole board 104 in the region where first material 211 is located. In the exemplary embodiment shown in FIG. 3, first material 211 creates flex zone 110 that is circular in shape. However, in other embodiments, the shape of first material 211 may be any shape created by controlling the material flow rates of one or more injection molding nozzles.

A first thickness 215 of first material 211 may be any desired thickness that can be accommodated in a mold and then inserted and used in an article of footwear. In an exemplary embodiment shown in FIG. 4, first thickness 215 of first material 211 is preferably substantially equal to second thickness 217 of second material 213 in the proximity of bonding zone 219 where the two materials meet.

The location of first material 211 on inner sole board 104 may also vary. In some embodiments, first material 211 may be located substantially centrally within forefoot region 108 of inner sole board 104. However, in other embodiments, first material 211 may be located in a different location or in multiple locations. For example, first material 211 may be located in heel region 111 instead of or in addition to forefoot region 108. In yet other embodiments, first material 211 may be located more towards lateral side 221 of inner sole board 104 or more towards medial side 223 (shown in FIG. 3) of inner sole board 104.

Flexibility of inner sole board 104 may also be varied by changing the characteristics of second material 213 that makes up inner sole body 209. In different embodiments, the material composition, shape, and thickness of second material 213 may vary.

The material composition of second material 213 may be adjustable so that the stiffness of second material 213 may be increased or decreased. For example, second material 213 may be a polypropylene material containing glass. The percentage of glass in second material 213 may be varied so that an increase in glass increases the stiffness of second material 213 and a decrease in glass percentage decreases the stiffness of second material 213.

Inner sole body 209 generally defines the overall shape of inner sole board 104. The shape of second material 213 or inner sole body 209 may be any shape that fits in an article of footwear of the target size. In some embodiments and like sock liner 102, inner sole body 209 may cover substantially the entire sole region of an article of footwear. However, in other embodiments, inner sole body 209 may be smaller than the sole region of an article of footwear. In an exemplary embodiment shown in FIGS. 3-5, the general shape of inner sole body 209 is such that it curves at the edges to cradle the wearer's foot. However, in other embodiments inner sole body 209 may not cradle the wearer's foot.

Second thickness 217 of second material 213 may be any desired thickness that can be accommodated in a mold and ultimately in the target article of footwear. Second thickness 217 may vary along the length and width of inner sole board 104. However, in some embodiments second thickness 217 substantially equals first thickness 215 in the proximity of bonding zone 219 where the two materials meet.

Due to the ability to vary the stiffness of first and second materials 211, 213, it may be advantageous to provide first material 211 or second material 213 with different colors. These colors may reflect the level of stiffness of either material or the glass percentage in second material 213. This may be done so that individuals at the manufacturing factory, distributor, retailer, and user may readily determine or verify the material, flexibility, or stiffness characteristics of the inner sole board they possess. A key to the meaning of the different colors may be provided.

Inner sole board 104 may be customized by selecting first material 211 and the size and shape of flex zone 110 to tune the flexibility of inner sole board 104. The flexibility of inner sole board 104 may be tuned during the manufacturing process. The manufacturing process may be an injection molding process. FIGS. 6-12 show an embodiment of such an injection molding process.

Inner sole board 104 may be manufactured in an injection molding process that requires only one mold. Generally, injection molding is a process of forming objects by heating molding material to a liquid form and injecting the material into a mold. Typically, co-molding is a type of injection molding where more than one material is injected into a mold having one cavity. Generally, co-molding is different from an over molding injection molding process. Over molding involves the use of multiple molds that are filled in multiple steps. Inner sole board 104 may be manufactured using a co-molding process where the mold has one cavity that receives both materials and both materials may be received simultaneously.

In some embodiments, first material 211 for flex zone 110 and the second material 213 for inner sole body 209 may be delivered into a single mold. The mold may be similar to mold 200 shown in FIGS. 7-8 and 10-12. During the injection molding process, the delivery of first material 211 may be controlled by one or more nozzles having gates or valves. The nozzles may be similar to nozzles 242, 243 shown in FIGS. 8-9 and 11. Nozzles 242, 243 may control the flow rate of first material 213 in order to control the shape and size of flex zone 110. In this manner, inner sole board 104 may be customized for a specific sport or individual.

Figure 6:
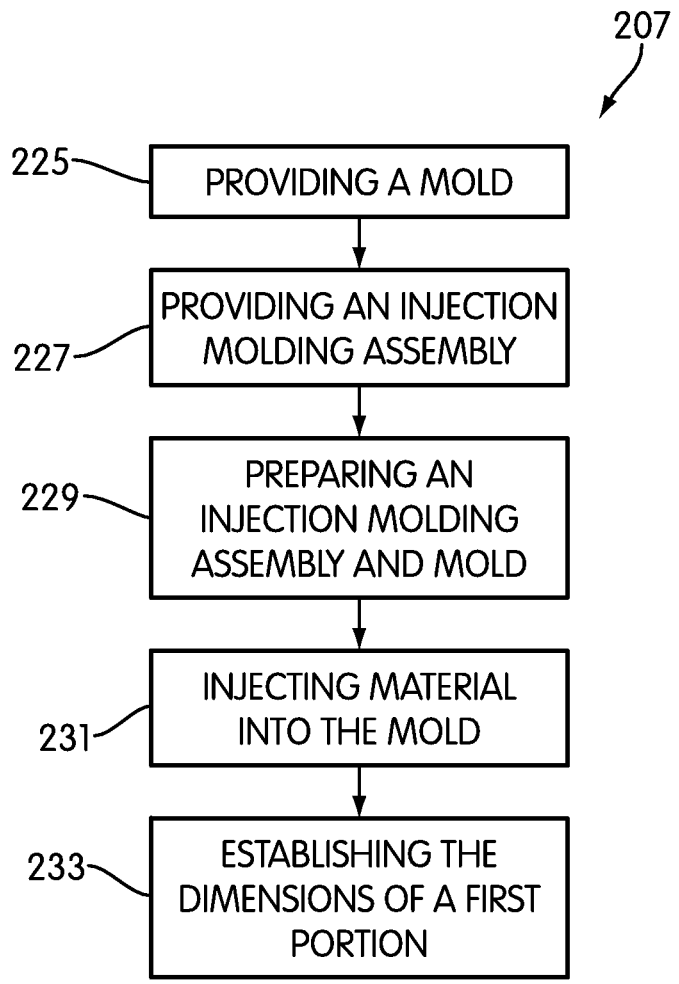
FIG. 6 is a schematic diagram of one embodiment of a process for making an inner sole board.

FIG. 6 is a schematic diagram of an embodiment of a process 207 for making inner sole board 104. Referring to FIG. 6, process 207 for making inner sole board 104 may include a first step 225 of providing a mold, a second step 227 of providing an injection molding assembly, a third step 229 of preparing an injection molding assembly and mold, a fourth step 231 of injecting material into the mold, and a fifth step 233 of establishing the dimensions of a first portion.

Figure 7:
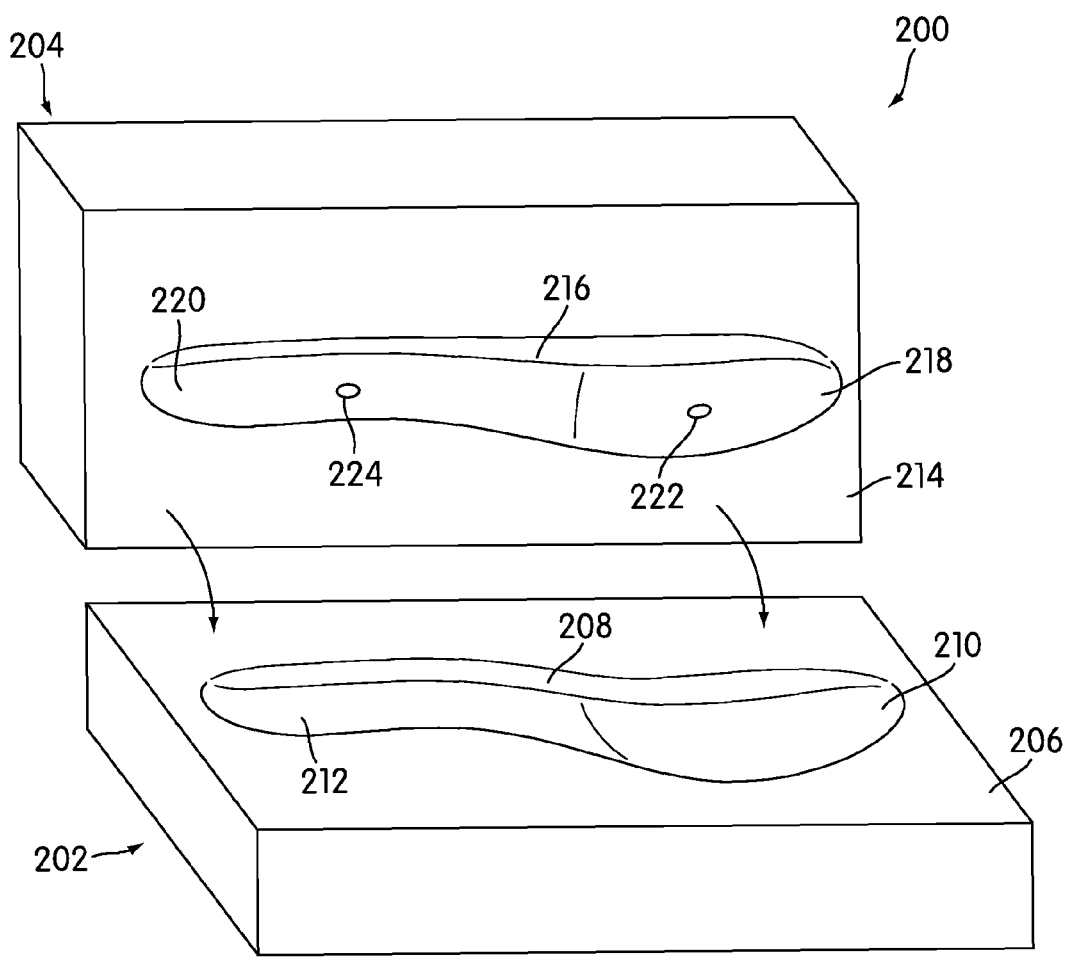
FIG. 7 is a schematic isometric view of one embodiment of a two-part mold with one part rotated so that the mold is open.
Figure 12:
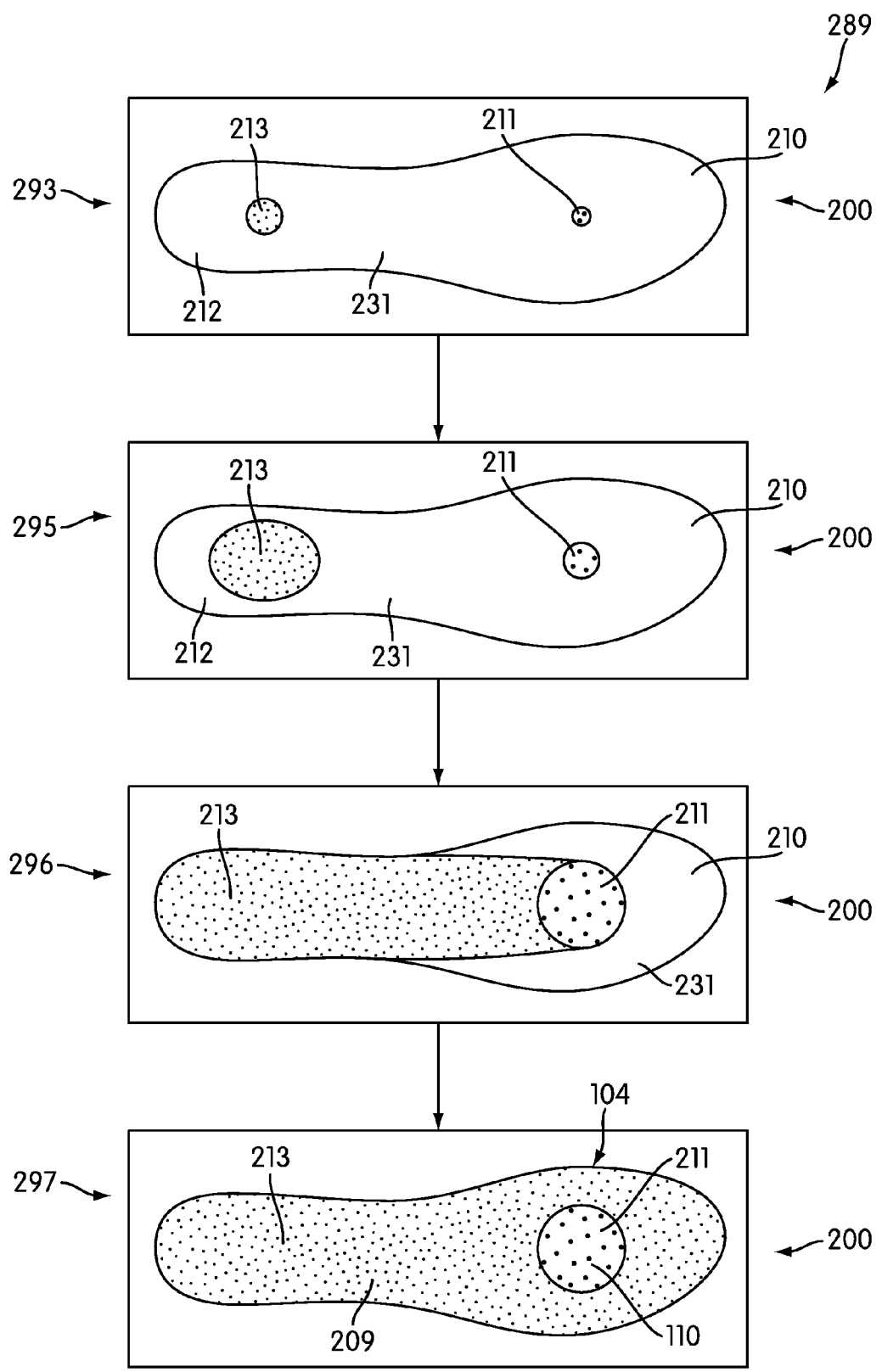
FIG. 12 is a schematic cross-sectional diagram of the mold shown in FIG. 11 as the mold is being filled to form one embodiment of an inner sole board, taken along line 12-12.
Figure 13:
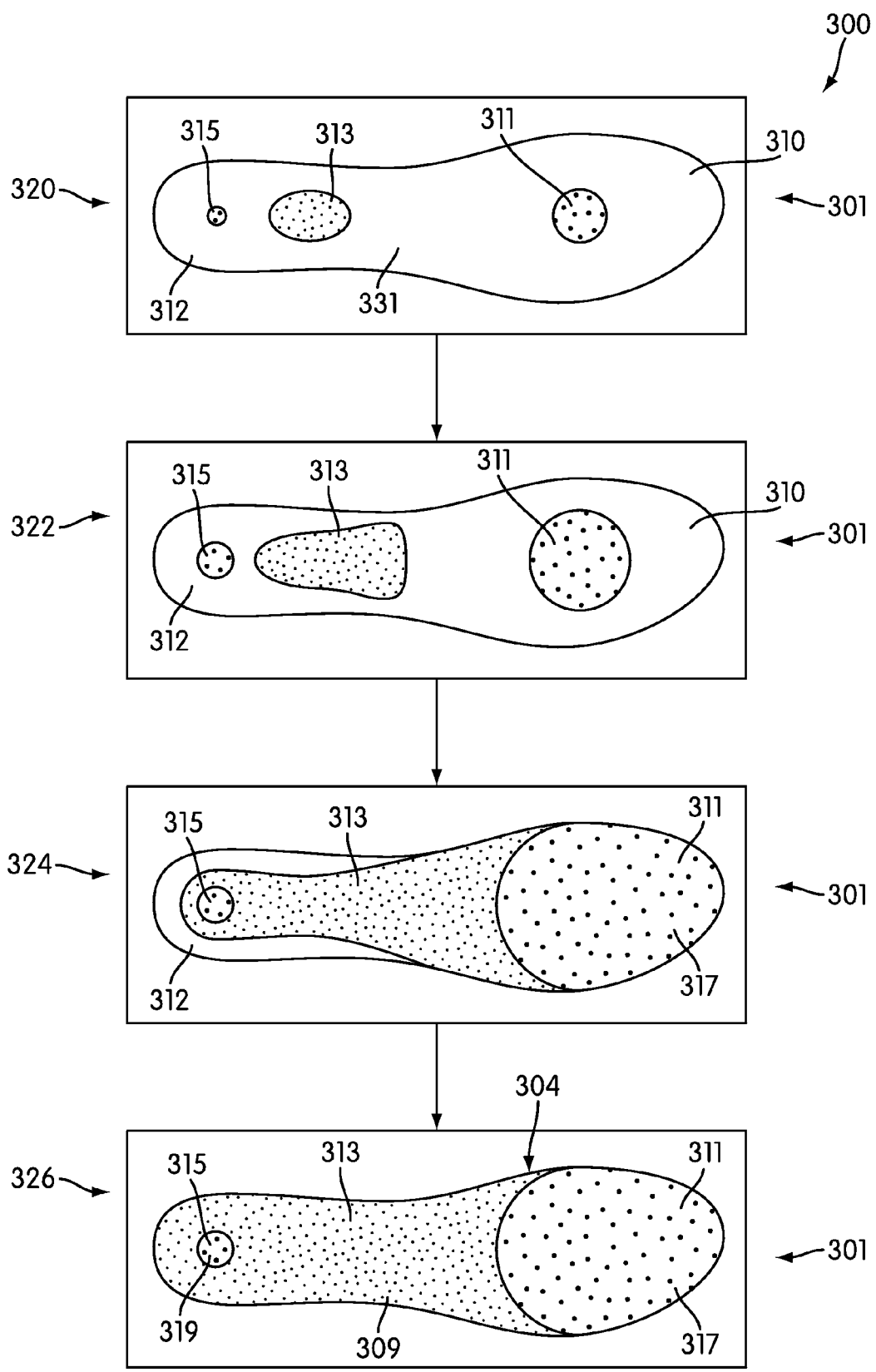
FIG. 13 is a schematic cross-sectional diagram of a mold as the mold is being filled to form another embodiment of an inner sole board.

In first step 225, a mold 200 may be provided. FIG. 7 is a schematic isometric view of an embodiment of a mold that may be used to injection mold inner sole board 104 (shown in FIGS. 3-5). Referring to FIG. 7, mold 200 may be used for injection molding manufacturing purposes. In one embodiment, mold 200 may be used for co-molding purposes. Mold 200 may include a first mold portion 202 and a second mold portion 204. First mold portion 202 may have a first mold portion interior face 206 provided with a mold recess 208. Mold recess 208 may include a forefoot recess section 210 and a posterior recess section 212. Second mold portion 204 may have second mold portion interior face 214 provided with a mold protrusion 216. In FIG. 7, second mold portion 204 is rotated to clearly show interior face 214. Mold protrusion 216 may include a forefoot protrusion section 218 and a posterior protrusion section 220. Second mold portion 204 may also include a first material interior aperture 222 and a second material interior aperture 224. First material interior aperture 222 and second material inlet aperture 224 may be configured to introduce first material 211 and second material 213, respectively, to mold 200, as shown in FIGS. 12-13.

Figure 8:
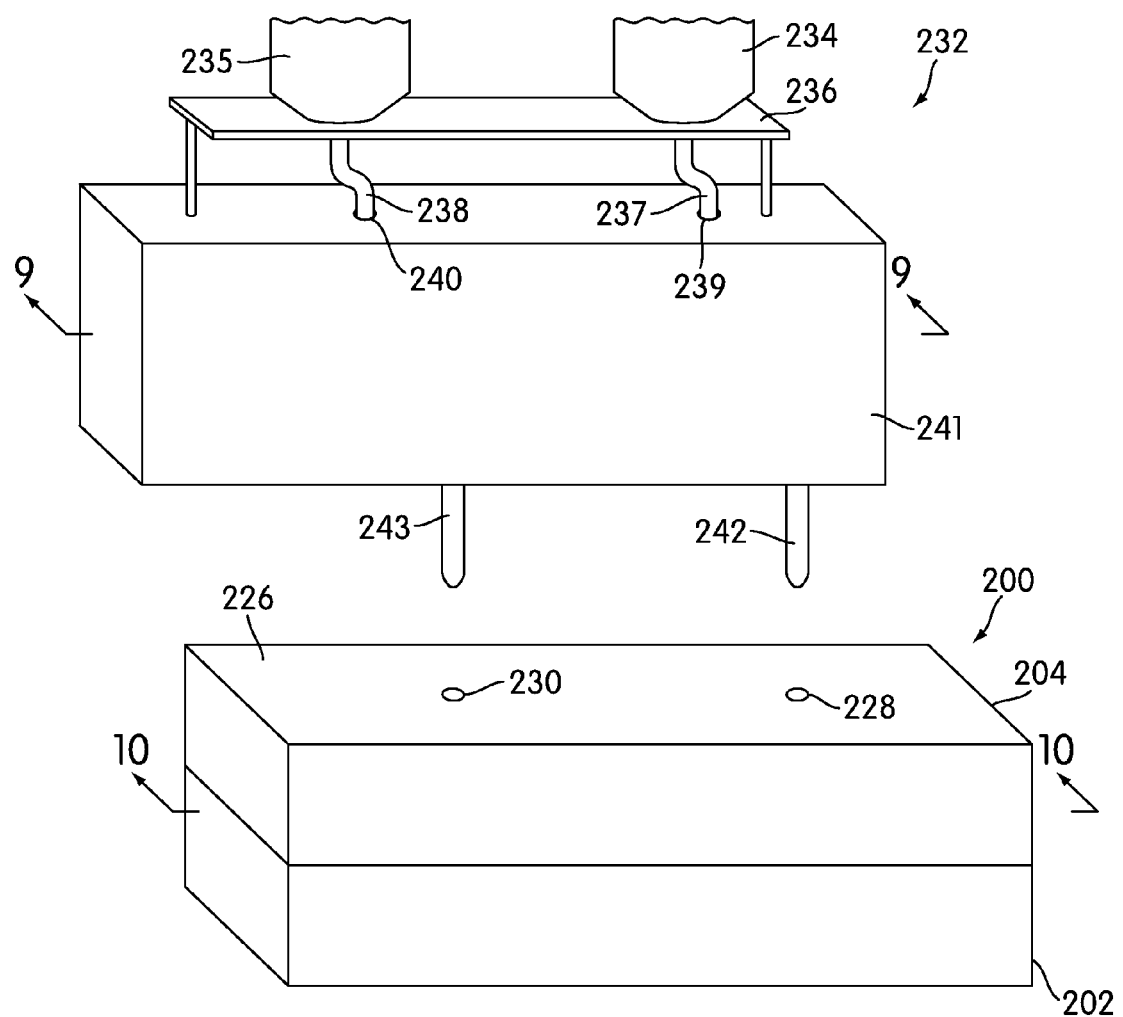
FIG. 8 is a schematic isometric view of one embodiment of an injection molding assembly and a mold.

FIG. 8 is a schematic isometric view of an embodiment of injection molding assembly 232 and mold 200. Referring to FIG. 8, mold 200 may be placed in a closed position and positioned in proximity to injection molding assembly 232. In the closed position, first mold portion 202 and second mold portion 204 may be positioned against each other. Second mold portion exterior face 226 may be oriented toward injection molding assembly 232. Second mold portion exterior face 226 may include first material exterior aperture 228 and second material exterior aperture 230.

In second step 227, injection molding assembly 232 may be provided. Injection molding assembly 232 may provide first material 211 and second material 213 to mold 200. Injection molding assembly 232 may include first and second barrels 234, 235, platform 236, first and second barrel lines 237, 238, assembly body 241, and first and second nozzles 242 and 243.

First barrel 234 may be mounted on platform 236. First barrel 234 may be capable of housing and heating first material 211 until first material 211 becomes a flowable melt. First barrel line 237 may connect first barrel 234 to assembly body 241 at first manifold aperture 239. Assembly body 241 may connect first barrel line 237 to first nozzle 242. Assembly body 241 may also be heated so that first material 211 remains in a molten state. First nozzle 242 may be used to inject first material 211 into mold 200. Similarly, second material 213 may be housed in second barrel 235 that may be mounted on platform 236. Second material 213 may be heated into a flowable melt. Assembly body 241 may be connected to second barrel 235 by second barrel line 237. Through assembly body 241, second barrel line 237 may be connected to second nozzle 243. Second nozzle 243 may be used to inject second material 213 into mold 200.

Figure 9:
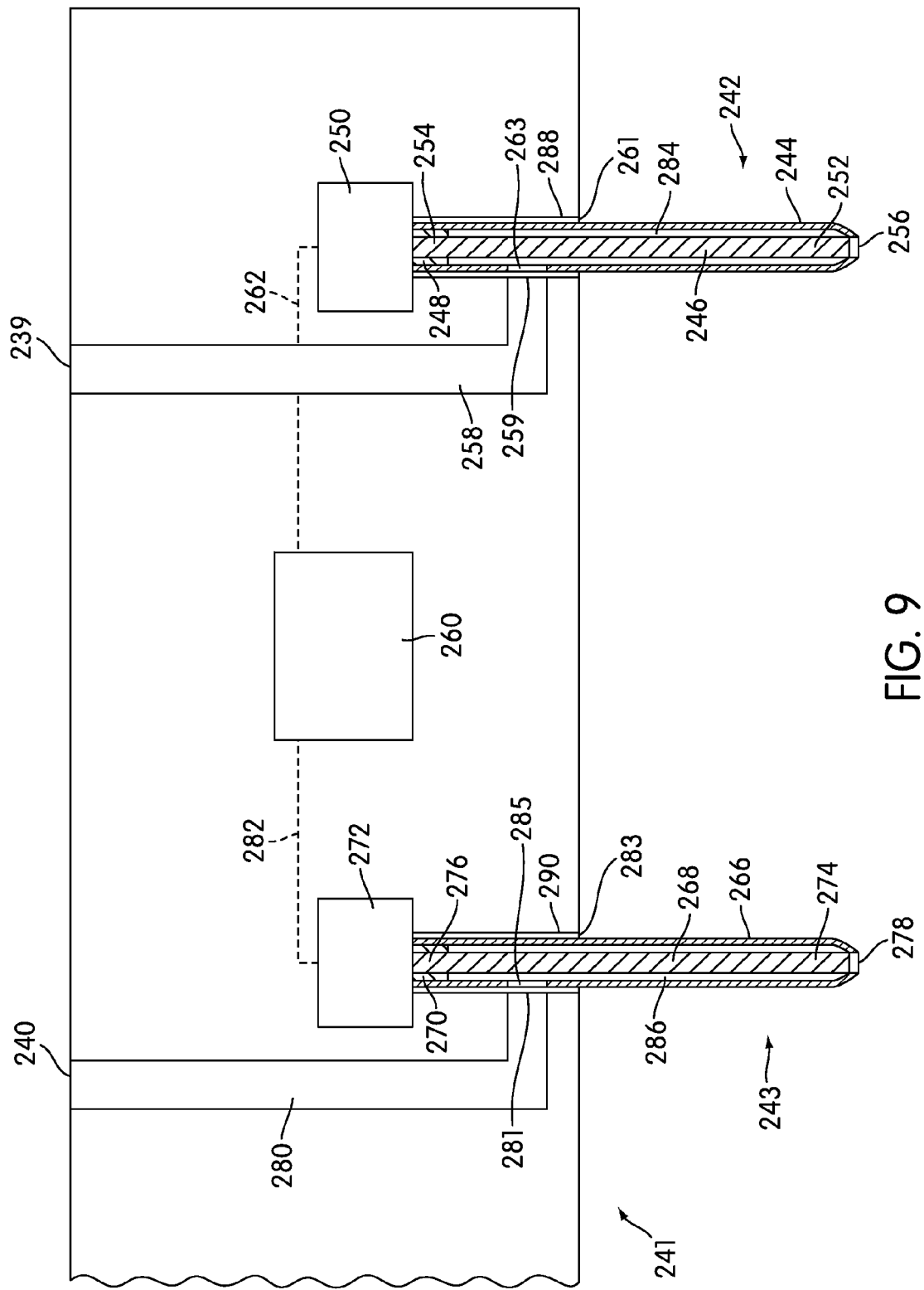
FIG. 9 is a schematic cross-sectional diagram of a portion of the injection molding assembly shown in FIG. 8, taken along line 9-9.

FIG. 9 is a schematic cross-sectional diagram of an embodiment of a portion of an injection molding assembly 232. Referring to FIG. 9, first nozzle 242 and second nozzle 243 may be associated with assembly body 241. In some embodiments, nozzles 242, 243 may be disposed at least partially inside assembly body 241. However, in other embodiments, nozzles 242, 243 may only be in the vicinity of assembly body 241.

Assembly body 241 may include manifold passages 258 and 280, actuators 250 and 272, and control unit 260. Assembly body 241 may include a first passage 258 connecting a first manifold aperture 239 to a first internal manifold aperture 259. First passage 258 may intersect a first bore 288 at first internal manifold aperture 259. First bore 288 may open to the exterior of assembly body 241 at first bore aperture 261 and may extend into assembly body 241 to meet first nozzle actuator 250.

First nozzle 242 may be partially disposed within assembly body 241. First nozzle 242 may extend from first nozzle actuator 250 inside assembly body 241 through first bore aperture 261 to an exterior environment of assembly body 241. First nozzle 242 may be comprised of a first nozzle shell 244, a first nozzle pin 246, and first nozzle piston 248. First nozzle shell 244 may have a first nozzle internal aperture 263 that meets first internal manifold aperture 259. Although FIG. 9 shows the walls of first bore 288 as spaced from first nozzle shell 244, first nozzle shell 244 may be in contact with the walls of first bore 288. First nozzle shell 244 may also includes a first nozzle external aperture 256 that opens to the exterior of assembly body 241.

The combined motion of first nozzle pin 246 and first nozzle piston 248 may control the flow rate of first material 211 through first nozzle external aperture 256. First nozzle pin 246 may be extended toward and retracted away from first nozzle external aperture 256. As shown in FIG. 9, first nozzle pin includes a first end 252 and a second end 254. First nozzle pin first end 252 may close first nozzle external aperture 256 when first nozzle pin 246 is fully extended. First nozzle piston 248 may also be extended toward and retracted away from first nozzle external aperture 256. As illustrated in FIG. 9, first nozzle piston 248 remains in a retracted position when first nozzle pin 246 is in a fully extended position.

First nozzle pin 246 and first nozzle piston 248 may be actuated in different ways. Actuator 250 may be any type of actuator known in the art. For example, a mechanical, pneumatic, or electrical actuator may be used. Actuator 250 may also be operated by a any method known in the art. For example, actuator 250 may receive a signal through first line 262 from control unit 260 indicating the desired movement of first nozzle pin 246 and first nozzle piston 248. The electrical signal may be received by an electric motor (not shown) that mechanically moves first nozzle pin 246 and first nozzle piston 248 to their desired positions.

Additional passages, bores, and actuators may be similarly positioned and structured to support additional nozzles. For example, assembly body 241 may include a second passage 280 connecting a second manifold aperture 240 to a second internal manifold aperture 281. Second passage 280 may intersect a second bore 290 at second internal manifold aperture 281. Second bore 290 may open to the exterior of assembly body 241 at second bore aperture 283 and may extend into assembly body 241 to meet second nozzle actuator 272.

Similar to first nozzle 242, second nozzle 243 may be partially housed within assembly body 241. Second nozzle 243 may also include a second nozzle shell 266, a second nozzle pin 268, and second nozzle piston 270. Second nozzle pin 268 may include a first end 274 and a second end 276. Second nozzle pin first end 274 may close second nozzle external aperture 278 when second nozzle pin 268 is in an extended position. Second nozzle shell 266 may have a second nozzle internal aperture 285 that is in fluid communication with second internal manifold aperture 281. Second nozzle shell 266 may also include a second nozzle external aperture 278 that may be positioned beyond assembly body 241 and inserted into mold 200 (shown in FIG. 11). Second nozzle 243 includes an associated actuator 272 and may be actuated similarly to first nozzle 242 by control unit 260 through an associated second line 282.

In some embodiments, control unit 260 may control the injection molding assembly 232 by communicating with one or more actuators 250, 272. In operation, control unit 260 first determines the desired amount of a molten first material 211 and a desired amount of a molten second material 213 to be injected into mold 200. Control unit 260 may make this determination based on input from a local or remote computer (not shown), which indicates at least the desired size and shape of flex zone 110. Based on this information, the flow rates of first and second materials 211, 213 through nozzles 242, 243 may be processed and the position information for first and second nozzle pins 246, 268 and first and second nozzle pistons 248, 270 are determined. The position information may be transmitted to actuators 250, 272 through lines 262, 282 respectively as signals. The signals may initiate actuators 250, 272 to move first and second nozzle pins 246, 268 and first and second nozzle pistons 248, 270 to the desired positions to create the desired flow rates.

In different embodiments, control unit 260 may include a number of ports that facilitate the input and output of information and power. The term "port" means any interface or shared boundary between two conductors. In some cases, ports may facilitate the insertion and removal of conductors. Examples of these types of ports include mechanical connectors. In other cases, ports are interfaces that generally do not provide easy insertion or removal. Examples of these types of ports include soldering or electron traces on circuit boards. Some embodiments may include a given port or provision, while others may exclude it.

Figure 10:
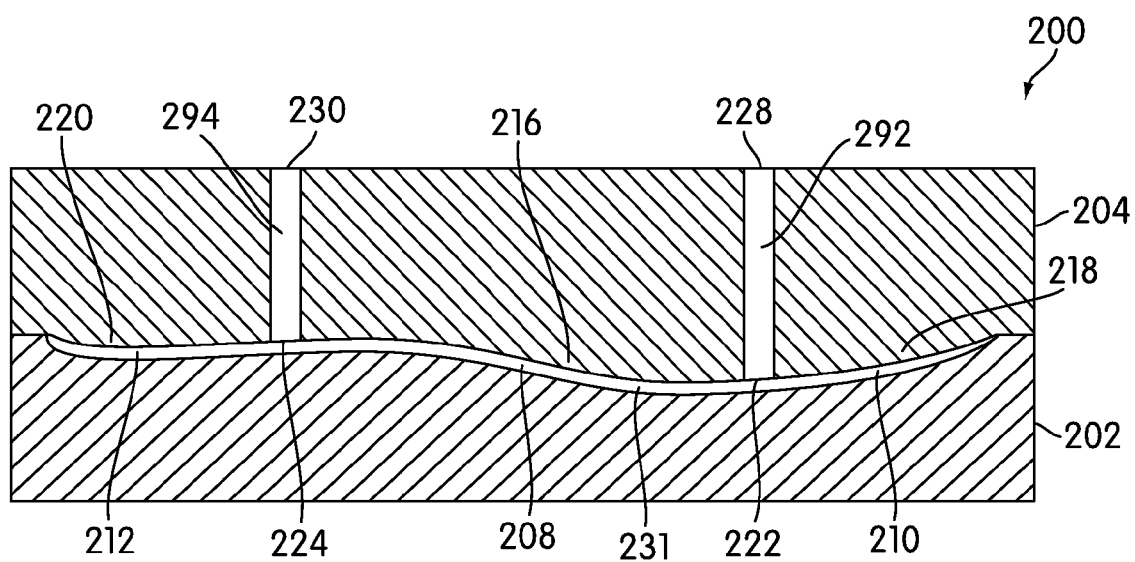
FIG. 10 is a schematic cross-sectional diagram of the mold shown in FIG. 8, taken along line 10-10.

In third step 229, an injection molding assembly 232 and mold 200 may be prepared. FIG. 10 is a schematic cross-sectional diagram of an embodiment of a mold 200. First mold portion 202 and second mold portion 204 may be placed in contact with each other to create closed mold 200. Mold 200 may include a first mold passage 292 that begins at first exterior mold aperture 228 and extends through second mold portion 204 to first interior mold aperture 222. Similarly, mold 200 may include a second mold passage 294 that begins at second exterior mold aperture 230 and extends through second mold portion 204 to second interior mold aperture 224.

First mold portion 202 and second mold portion 204 mate to create a mold cavity 231. In some embodiments, mold cavity 231 may be a result of mold protrusion 216 being partially inserted into mold recess 208. The remaining empty space of mold recess 208 generally creates mold cavity 231. However, in other embodiments, the positions of mold protrusion 216 and mold recess 208 may be reversed so that first mold portion 202 includes a protrusion and second mold portion 204 includes a recess. In yet other embodiments, first mold portion 202 and second mold portion 204 each may include a combination of protrusions, recesses, and flat surfaces depending on the desired shape of an inner sole board.

The portion of mold cavity 231 created by forefoot protrusion 218 and forefoot recess 210 correspond to forefoot region 108 of inner sole body 104. The portion of mold cavity 231 created by posterior protrusion 220 and posterior recess 212 correspond to mid-foot region 109 and heel region 111 of inner sole body 104.

Figure 11:
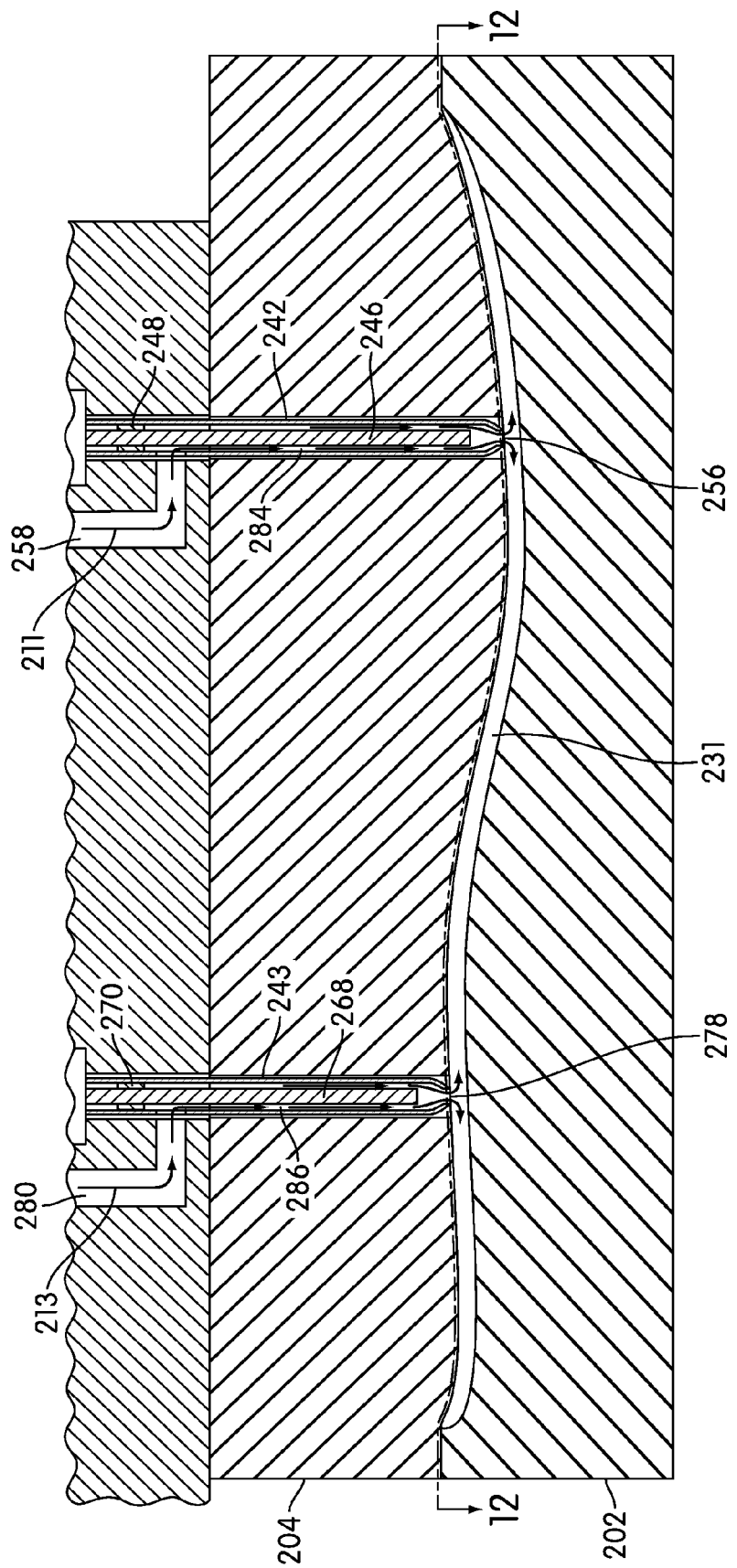
FIG. 11 is a schematic cross-sectional diagram of one embodiment of injection molding nozzles inserted within a mold.

FIG. 11 is a schematic cross-sectional diagram of injection molding nozzles 242, 243 inserted within mold 200. Prior to filling mold 200, injection molding assembly 232 may be moved so that first and second nozzles 242, 243 may be inserted within passages 258, 280 of mold 200. In some embodiments, first nozzle 242 and second nozzle 243 do not protrude into cavity 231. However, in other embodiments, nozzles 242, 243 may protrude into cavity 231.

In fourth step 229, material may be injected into mold 200. In operation, first barrel 234 containing first material 211 may be heated to melt first material 211. Molten first material 211 then flows through first barrel line 237 and into assembly body 241 as indicated by the arrows in FIG. 11. Finally, first nozzle 242 may controllably inject molten first material 211 into mold 200. In a similar manner, second material 213 may be heated in second barrel 235 and injected through second nozzle 243 into mold 200 as indicated by the arrows.

When the injection molding process begins, first and second materials 211, 213 may melt and fill first nozzle interior 284 and second nozzle interior 286, respectively. Actuators 250, 272 may move first nozzle pin 246 and second nozzle pin 268 to retracted positions. The actuators may also move first nozzle piston 248 and second nozzle piston 270 to extended positions. As first and second nozzle pistons 248, 270 move toward extended positions, pistons 248, 270 push first and second materials 211, 213 through nozzle outlet apertures 222, 224, respectively, and into cavity 231.

In different embodiments, the flow rate of first and second materials 211, 213 may be varied in different ways. In some embodiments, nozzle pins 246, 268 and pistons 248, 270 may be moved to control the flow rates of first and second materials 211, 213, respectively. However, in other embodiments, only nozzle pins 246, 268 may move to control the flow rates of first material and second material 211, 213, respectively.

In fifth step 233, the dimensions of a first portion are established by controlling the first nozzle 242 and second nozzle 243. Inner sole board 104 pictured in FIGS. 3-5 may be manufactured in the following manner by using the injection molding setup shown in FIGS. 7-11. In one embodiment, the injection molding process may be a hot injection molding process that produces a mechanical and/or chemical bond between two different materials.

FIG. 12 is a schematic cross-sectional diagram of mold 200. Process 289 shows how mold 200 may be filled to produce inner sole board 104 as time t progresses. First view 293 shows mold 200 at a time t=1. Second view 295 shows mold 200 at a time t=1+x. Third view 296 shows mold 200 at a time t=1+y. Fourth view 297 shows mold 200 at a time t=1+z. For the purposes of this discussion, z>y>x. In first view 293, first material 211 begins to occupy forefoot recess 210 and second material 213 begins to occupy posterior recess 212. In second view 295 first and second materials 211, 213 continue to fill cavity 231. The flow rates of first material 211 and second material 213 from first view 293 to second view 295 remain constant. However, the flow rates of materials 211, 213 may differ.

In third view 296, first nozzle 242 associated with first material 211 is shut off, but the flow rate of second material 213 has not changed. Second material 213 may contact first material 211 at this time and begin to surround first material 211. In fourth view 297, cavity 231 may be filled and second nozzle 243 associated with second material 213 may be closed.

The dimensions of first portion or forefoot flex zone 110 may be established by controlling a first flow rate through first nozzle 242. The dimensions may also be controlled by varying the first nozzle time on, the time at which first nozzle 242 may be turned on, and the first nozzle time off, the time at which first nozzle 242 may be turned off.

The dimensions of first portion 110 may also be established by controlling a second nozzle time on, the time at which second nozzle 243 may be turned on, and a second nozzle time off, the time at which second nozzle 243 may be turned off. Contact between first material 211 and second material 213 may control the size of first portion or forefoot flex zone 110. When second material 213 contacts first material 211, second material 213 begins to surround and reduce the spread of first material 211. Additionally, the temperatures of molten first material 211 and molten second material 213 facilitates mechanical and/or chemical bonding between first material 211 and second material 213. The temperatures of molten materials 211, 213 are equal to or higher than the bonding temperature of materials 211, 213.

In one embodiment, first nozzle 242 and second nozzle 243 may be turned on simultaneously. In other embodiments, first nozzle time on and second nozzle time on may be staggered. For example, in one embodiment, first nozzle 242 may be turned on prior to second nozzle 243. In another embodiment, second nozzle 243 may be turned on prior to first nozzle 242. The time between first nozzle time on and second nozzle time on may also vary. First nozzle time off and second nozzle time off may vary similarly to first nozzle time on and second nozzle time on. Therefore, in some embodiments, first nozzle time on and first nozzle time off occur prior to second nozzle time on and second nozzle time off.

Generally, after cavity 231 is filled, mold 200 is moved so that the material of inner sole board 104 may cure. The material of inner sole board 104 may be cured using any method known in the art. For example, inner sole board 104 may be cooled at ambient temperature, undergo controlled cooling in an oven, ultraviolet curing, or the like. Once cured, inner sole board 104 may be removed from mold 200.

Inner sole board 104 may have any of a number of different configurations depending upon the desired flexibility characteristics of inner sole board 104. In some embodiments, inner sole board 104 having one flex zone 110 may be manufactured using two nozzles to deliver two materials. In another embodiment, inner sole board 104 may have two or more flex zones and may be manufactured in an injection molding process that uses three or more nozzles to deliver two or more materials into one mold.

FIG. 13 is a schematic cross-sectional diagram of an embodiment of a mold fitted with three nozzles. Referring to FIG. 13, process 300 shows how second mold 301 may be filled to produce second inner sole board 304 having two flex zones 317, 319 and inner sole body 309 as time t progresses. A first flex zone 317 may be positioned in the forefoot recess 310 and a second flex zone 319 may be positioned in posterior recess 312. First flex zone 317 may be substantially coextensive with forefoot recess 310 and therefore, substantially coextensive with the forefoot region of inner sole board 304.

First view 320 shows mold 301 at a time t=1. Second view 322 shows second mold 301 at a time t=1+x. Third view 324 shows second mold 301 at a time t=1+y. Fourth view 326 shows mold 301 at a time t=1+z. For the purposes of this discussion, z>y>x. In first view 320, first material 311, second material 313, and third material 315 begin to occupy forefoot recess 310 and posterior recess 312. In this embodiment, first material 311 and third material 315 may be the same material while second material 313 may be a different material. The flow rates of first, second, and third materials 311, 313, 315 may remain constant but may not equal each other.

In second view 322 first and second materials 311, 313 continue to fill recesses 310, 312. However, third material 315 has ceased flowing. The flow rates of first and second materials 311, 313 remain constant from views 320 to 322. However, the flow rates of materials 311, 313 are not the same. In third view 324, the nozzle associated with first material 311 may be shut off, but second material 313 may continue to flow. Second material 313 may contact first material 311 and third material 315 at this time and begin to surround both materials 311, 315. In fourth view 326, the open portions of forefoot recess 310 and posterior recess 312 may be filled, and the nozzle associated with second material 313 may be closed. Similar to nozzles 242, 243, the three nozzles associated with mold 301 may have varying nozzle time on and nozzle time off sequences.

Figure 14:
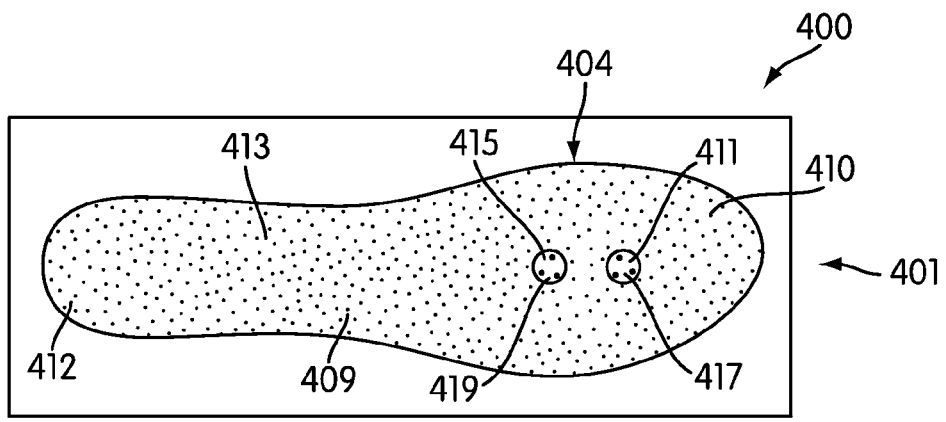
FIG. 14 is a schematic cross-sectional diagram of a filled mold containing another embodiment of an inner sole board.

In another embodiment, a third inner sole board 404 may be manufactured in third mold 401 having two flex zones 417, 419 in the forefoot region and inner sole body 409. FIG. 14 is a schematic cross-sectional diagram of an embodiment of a mold fitted with three nozzles. Referring to FIG. 14, view 400 shows a filled third mold 401. A first nozzle may be associated with first material 411, a second nozzle may be associated with second material 415, and a third nozzle may be associated with third material 413. In this embodiment, materials 411 and 415 may be the same material or different materials while third material 413 may be different from both first and second materials 411, 415. Similar to nozzles 242, 243, the three nozzles associated with mold 401 may have varying nozzle time on and nozzle time off sequences.

Figure 15:
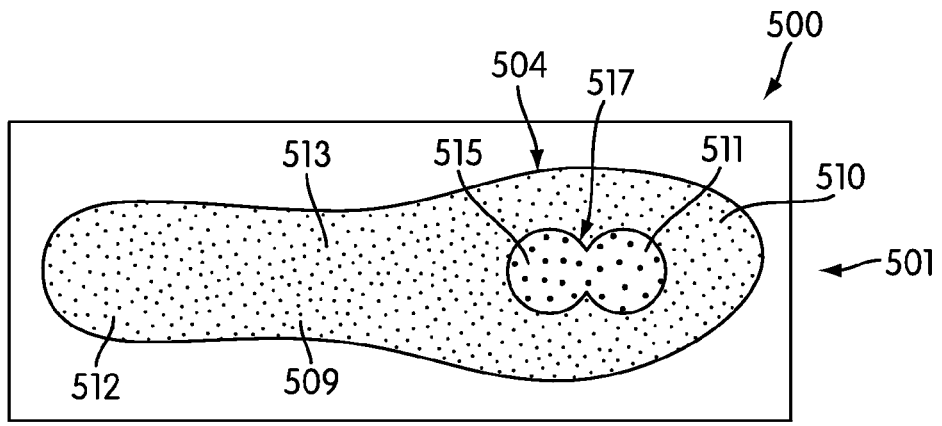
FIG. 15 is a schematic cross-sectional diagram of a filled mold containing another embodiment of an inner sole board.

In another embodiment, a fourth inner sole board 504 may be manufactured in fourth mold 501 having flex zone 517 in forefoot region 510. FIG. 15 is a schematic cross-sectional diagram of an embodiment of a mold fitted with three nozzles. Referring to FIG. 15, view 500 shows filled fourth mold 501. A first nozzle may be associated with first material 511, a second nozzle may be associated with second material 513, and a third nozzle may be associated with third material 515. In this embodiment, materials 511 and 515 may be the same material or different materials while third material 513 may be different from both first and second materials 511, 515. Additionally, in this embodiment, the nozzles associated with materials 511, 515 remain open until enough material is delivered to produce a forefoot flex zone 517 shaped as a figure eight. Here, the circular pattern formed by each nozzle blend together or overlap slightly to form a figure eight. Similar to nozzles 242, 243, the three nozzles associated with mold 501 may have varying nozzle time on and nozzle time off sequences.

Figure 16:
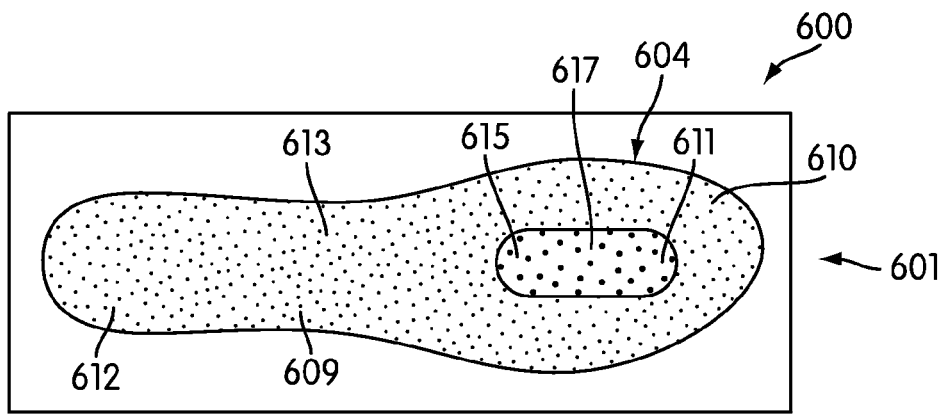
FIG. 16 is a schematic cross-sectional diagram of a filled mold containing another embodiment of an inner sole board.

In another embodiment, as shown in FIG. 16, a fifth inner sole board 604 may be manufactured in fifth mold 601 having one flex zone 617 in forefoot region 610. First and second nozzles may be associated with first material 611 and second material 615, respectively. A third nozzle may be associated with third material 613. In this embodiment, materials 611 and 615 may be the same material or different materials while third material 613 may be different from both first and second materials 611, 615. Additionally, in this embodiment, the nozzles associated with first and second materials 611, 615, remain open until enough material may be delivered to produce forefoot flex zone 617 of an oblong shape. Here, circular pour patterns combine to form an oblong shape. Similar to nozzles 242, 243, the three nozzles associated with mold 301 may have varying nozzle time on and nozzle time off sequences.

A kit of inner sole boards including one or more sets of inner sole boards may be sold with footwear or separately so that a user may choose an inner sole board with flexibility characteristics for a desired activity. For example, one set of inner sole boards may be inserted in an article of footwear for soccer, while another inner sole board set having a different flexibility characteristic may be inserted in an article of footwear for football. A kit of inner sole boards may also be sold with or without associated footwear.

Figure 17:
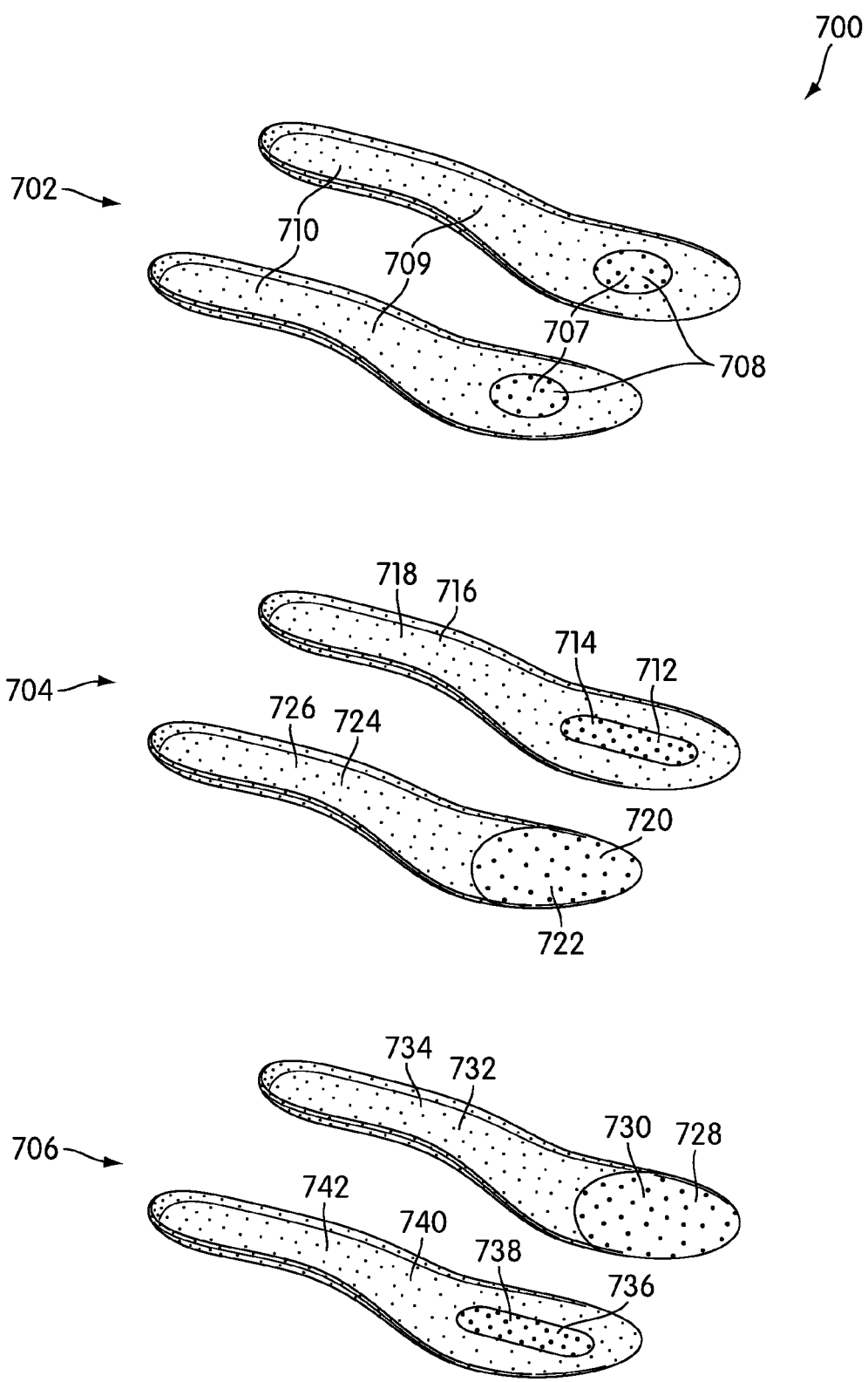
FIG. 17 is a schematic isometric view of an embodiment of a group of inner sole boards that may be provided as a kit with an article of footwear.

A kit of inner sole boards may include two or more sets of inner sole boards. FIG. 17 is a schematic isometric view of an embodiment of a group or kit of inner sole boards having various stiffnesses. Referring to FIG. 17, inner sole board kit 700 may include three sets of inner sole boards 702, 704, 706. Each set of inner sole boards 702, 704, 706 may include different flexibility characteristics.

A First inner sole board set 702 may include forefoot flex zones 707 made of a first material 708 and inner sole bodies 709 made of a second material 710. A second inner sole board set 704 may include left forefoot flex zone 712 made of a third material 714 and left inner sole body 716 made of a fourth material 718. Second inner sole board set 704 may also include a right forefoot flex zone 720 made of a fifth material 722 and a right inner sole body 724 made of sixth material 726. A third inner sole board set 706 may include a left forefoot flex zone 728 made of a seventh material 730 and a left inner sole body 732 made of an eighth material 734. Third inner sole board set 706 may also include a right forefoot flex zone 736 made of a ninth material 738 and a right inner sole body 740 made of a tenth material 742.

First material 708, third material 714, fifth material 722, seventh material 730, and ninth material 738 may be the same material or different materials. For example, first material 708 may be more rigid than third material 714, and third material 714 may be more rigid than seventh and ninth materials 730, 738.

Second material 710, fourth material 718, sixth material 726, and eighth material 734 may be the same material or different materials. If they are the same material, the flexibility of each inner sole board set may be altered by changing the shape of the associated flex zones. In the exemplary embodiment shown in FIG. 17, flex zone 707 may be shaped as a circle, flex zones 712, 736 may have an oblong shape, and flex zones 720, 728 may cover almost an entire forefoot region.

An individual may choose an inner sole board set where the left inner sole board has the same flexibility characteristics as right inner sole board. Alternatively, as shown by inner sole board sets 704, 706, left and right inner sole boards may differ to match the desired flexibility characteristics of each foot.

In other embodiments, kit 700 may include a group of inner sole boards that include only left-foot inner sole boards or only right-foot inner sole boards. In yet other embodiments, kit 700 may include a group of inner sole boards including left-foot inner sole boards and right-foot inner sole boards where no inner sole board in the group has flexibility characteristics similar to the inner sole boards in the remainder of the group.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. An article of footwear comprising:
   a ground-engaging sole plate;
   a sock liner; and
   an a solid inner sole board disposed between the ground-engaging sole plate and the sock liner and including:
      a first portion of the inner sole board that is more rigid than the sockliner, comprising a first rigid copolymer material;
      a second portion of the inner sole board that is more rigid than the sockliner, comprising a second rigid material; and
      a bonding zone of the inner sole board disposed where the first portion and the second portion are bonded to one another;
      the first rigid copolymer material having a greater flexibility than the second material;
      wherein a size and a location of the first portion with respect to the second portion is configured to conform to a set of flexibility characteristics associated with an activity; and
      wherein the bonding zone of the inner sole board comprises a mechanical bond between the first material and the second material that is initiated when the first material and second material are in a molten state, the bonding zone having a bond width, wherein the first portion of the inner sole board includes a first portion of the bond width, and wherein the second portion of the inner sole board includes a second portion of the bond width;
   wherein the ground engaging sole plate includes an exposed lower surface configured to be in contact with the ground, and an upper surface attached to the inner sole board;
   wherein the ground engaging sole plate includes one or more holes extending through the ground engaging sole plate; and
   wherein an area of the first portion of the inner sole board is exposed through the one or more holes extending through the ground engaging sole plate.

2. The article of footwear of claim 1 wherein the first portion is disposed in a forefoot region of the article of footwear.

3. The article of footwear of claim 1, wherein the first portion is disposed in a heel region of the article of footwear.

4. The article of footwear of claim 2, comprising:
   the first portion having a first thickness;
   the second portion having a second thickness; and
   wherein the first thickness and the second thickness are substantially equal proximate the bonding zone.

5. The article of footwear of claim 4, wherein the first portion has a circular shape.

6. The article of footwear of claim 4, wherein the first portion is substantially coextensive with the forefoot region.

7. An article of footwear comprising: a ground-engaging sole plate; a sock liner; and a solid inner sole board disposed between the ground-engaging sole plate and the sock liner and including: a first portion of the inner sole board that is more rigid than the sock liner, comprising a first rigid, substantially incompressible copolymer material; a second portion of the inner sole board that is more rigid than the sock liner, comprising a second rigid, substantially incompressible material; a bonding zone of the inner sole board disposed where the first portion and the second portion are bonded to one another; the first rigid copolymer material having a greater flexibility than the second material; wherein a size and a location of the first portion with respect to the second portion is configured to conform to a set of flexibility characteristics associated with an activity; wherein the bonding zone of the inner sole board comprises a mechanical bond between the first material and the second material that is initiated when the first material and second material are in a molten state, the bonding zone having a bond width, wherein the first portion of the inner sole board includes a first portion of the bond width, and wherein the second portion of the inner sole board includes a second portion of the bond width;
   wherein the ground engaging sole plate includes an exposed lower surface configured to be in contact with the ground, and an upper surface attached to the inner sole board;
   wherein the ground engaging sole plate includes one or more holes extending through the ground engaging sole plate; and wherein an area of the first portion of the inner sole board is exposed through the one or more holes extending through the ground engaging sole plate.

8. The article of footwear of claim 7, wherein the first portion is disposed in a forefoot region of the article of footwear.

9. The article of footwear of claim 8, comprising:
   the first portion having a first thickness;
   the second portion having a second thickness; and
   wherein the first thickness and the second thickness are substantially equal proximate the bonding zone.

10. The article of footwear of claim 9, wherein the first portion is substantially coextensive with the forefoot region.

11. The article of footwear of claim 7, wherein a top surface and a bottom surface of the first portion of the first inner sole board and a top surface and a bottom surface of the second portion of the first inner sole board are exposed and form outer surfaces of the inner sole board.

12. The article of footwear of claim 7, wherein the first portion has a circular shape.

13. The article of footwear of claim 7, wherein the first portion is disposed in a heel region of the article of footwear.

* * * * *